(12) United States Patent
Golner et al.

(10) Patent No.: US 7,119,646 B2
(45) Date of Patent: Oct. 10, 2006

(54) APPARATUS AND METHOD FOR CONTROLLING THE TEMPERATURE OF THE CORE OF A SUPER-CONDUCTING TRANSFORMER

(75) Inventors: Thomas Golner, Pewaukee, MI (US); Edward Pleva, Waukesha, WI (US); Shirish Mehta, Waukesha, WI (US)

(73) Assignee: Waukesha Electric Systems, Incorporated, Waukesha, WI (US)

( * ) Notice: Subject to any disclaimer, the term of this patent is extended or adjusted under 35 U.S.C. 154(b) by 737 days.

(21) Appl. No.: 10/017,381

(22) Filed: Dec. 18, 2001

(65) Prior Publication Data

US 2003/0112108 A1    Jun. 19, 2003

(51) Int. Cl.
*H01F 27/32* (2006.01)
(52) U.S. Cl. .................................... 336/84 C
(58) Field of Classification Search ............ 336/55–62, 336/84 R, 84 C, 198
See application file for complete search history.

(56) References Cited

U.S. PATENT DOCUMENTS 1,741,200 A * 12/1929 Palueff ..................... 336/70
2,007,167 A *  7/1935 Jones ...................... 219/612
3,461,413 A *  8/1969 Wood et al. .............. 336/84 R

* cited by examiner

*Primary Examiner*—Tuyen T Nguyen
(74) *Attorney, Agent, or Firm*—Baker & Hostetler LLP

(57) ABSTRACT

An apparatus for controlling the temperature of a core of a transformer is provided that includes a core, a shield surrounding the core, a cast formed between the core and the shield, and tubing positioned on the shield. The cast directs heat from the core to the shield and cooling fluid is directed through the tubing to cool the shield.

16 Claims, 6 Drawing Sheets

APPARATUS AND METHOD FOR CONTROLLING THE TEMPERATURE OF THE CORE OF A SUPER-CONDUCTING TRANSFORMER

This invention was made with government support under the High Temperature Super-Conducting Transformer contract awarded by the Department of Energy. The government has certain rights in the invention.

FIELD OF THE INVENTION

This invention relates to transformers and to the cooling of transformers. More particularly, this invention is directed to controlling the temperature of the core of a high temperature super-conducting transformer.

BACKGROUND OF THE INVENTION

In electrical power distribution, transformers are utilized in the transmission of electricity. Relatively low voltage high current electricity from a power plant generator is converted by a transformer to a high voltage low current supply for transmission over long distances. The high voltage supply is then converted by a second transformer back to a low voltage higher current supply for local distribution to customers. The process of transforming the supply to a high voltage is necessary to reduce losses in the supply during transmission.

In transforming the electrical supply from one voltage level to another voltage level, heat is generated in the core of the transformer. Mechanisms have been developed to remove this heat to improve performance of the transformers. Conventional transformers for use in power transmission are either oil-filled or dry-type transformers. In oil-filled transformers, the oil is circulated around the core and through a radiator. Heat from the core is transferred to the oil and then dissipated to the air surrounding the transformer through the radiator. In dry-type/air transformers, the air is cooled by natural or forced circulation of air or gas through and/or around the transformer.

Core heat is particularly undesirable in super-conducting transformers because the core heat can raise the temperature of the coils of the transformer that need to be maintained within an operative temperature range. Thus, rather than simply degrading performance, core heat can result in the inoperability of a super-conducting transformer. Therefore a mechanism is needed to cool the temperature of the core to avoid overheating the super-conducting coils.

SUMMARY OF THE INVENTION

In one aspect of the present invention an apparatus is provided for controlling the temperature of a core of a transformer that includes a shield surrounding the core, a cast formed between the core and the shield and tubing around on the shield.

In another aspect of the present invention a method is provided for controlling the temperature of a core of a transformer that includes placing a shield around the core of the transformer, forming a cast between the core and the shield, and placing tubing around the shield of the transformer.

In yet another aspect of the invention an apparatus for controlling the temperature of a core of a transformer is provided that includes a means for receiving heat from the core, a means for directing the heat from the core to the receiving means, and a means for cooling the receiving means, wherein the cooling means is placed on the receiving means.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
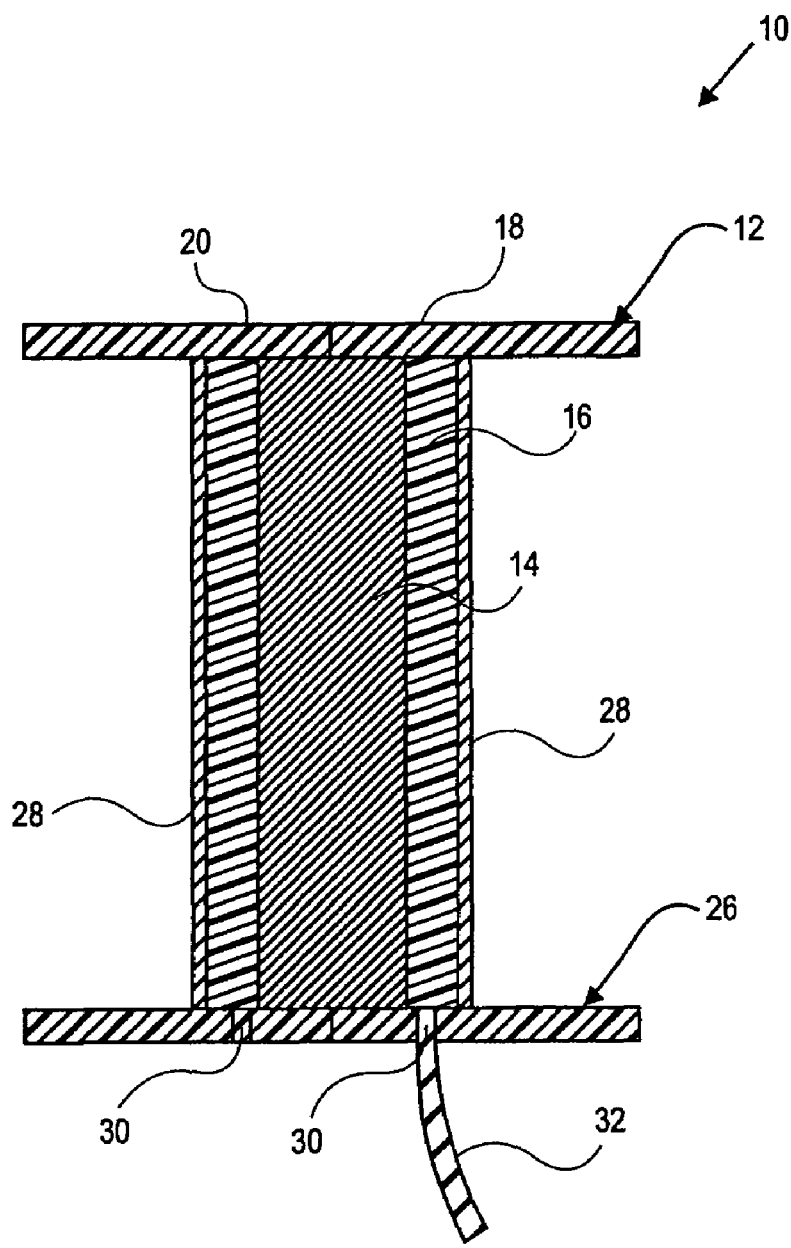
FIG. 1 is a cut-away view of the core of a super-conducting transformer in accordance with a preferred embodiment of the present.

Referring now to the figures, wherein like reference numerals indicate like elements, in FIG. 1 there is shown a super-conducting transformer 10 that employs the temperature control mechanism of the present invention.

In forming the transformer 10, a top mold 12 is placed on top of the core 14. The top mold 12 serves as a mold for forming a cast 16 around the core 14. In an exemplary embodiment, the top mold 12 may be formed from at least two portions 18, 20 and the mold portions 18, 20 are secured to each other to form the mold 12.

A bottom mold 26 is placed on the bottom of the core 14. The bottom mold 26 is constructed in the same manner as the top mold 12. By constructing each of the top and bottom molds from at least two mold portions, the molds can be easily removed from the core 14.

A shield 28 is placed around the core 14, such that is does not form a continuous or closed loop around the core. The shield 28 may be designed with an insulating break to eliminate the possibility of a closed conductive loop. A dielectric material or air is utilized to prevent the induction of a current by the shield. If the shield conducts current, it will generate heat that will be additional to the heat generated by the transformer 10 during operation. Thus, additional resources will be necessary to cool the transformer. Hence, the cost associated with cooling the transformer 10 will increase. In a preferred embodiment of the invention, the dielectric break is made from a high molecular weight plastic. It should be understood that the dielectric break may be formed from any type of insulator.

The shield 28 is made from a material with high thermal conductivity such as iron, copper, stainless steel or aluminum. In an exemplary embodiment, copper is utilized because it has the highest thermal conductivity of the common metals.

The diameter of the shield is selected to maintain a distance from the shield, such that there is a mechanical clearance from the core 14 and such that a short between the core and the shield is avoided. The diameter of the shield 28 is determined according to the size of the core 14 and/or the size of the tubing 34 that is used for cooling the core 14. Also, the diameter of the shield 28 may be chosen to maintain the shortest thermal path between the cast 16, which is formed around the core 10 as described below, and the shield 28, while maintaining mechanical clearance between the core 14 and the shield 28.

In a preferred embodiment, the shield 28 is constructed from a 16 gauge copper sheet formed into a tube having a 10" diameter. The gauge of the copper needed for forming the shield is determined by the mechanical strength required to support a column of epoxy and the cross-sectional area required to maintain a near uniform (e.g., within 5° C.) surface temperature on the surface of the shield 28. A lower thermal conductivity material may also be utilized, but the thickness required needs be greater to avoid the development of hot spots on the surface of the shield 28.

The top mold 12 and the bottom mold 26 may be assembled with the shield 28 when forming the cast 16 as described below. The top mold 12 and/or the bottom mold 26 may be provided with a recessed portion 29 for accommodating the shield 28. The recessed portion 29 of the top mold 12 and the bottom mold 26 is fitted with the shield 28, such that the position of the shield 28 is not altered when the cast 16 is formed. The shield 28 also provides mechanical support to the core 14. The shield 28 may be designed with an insulating break, to eliminate the possibility of a closed conductive loop.

Because the shield 28 is constructed from rolling a sheet of copper, there will be at least one seam resulting from the formation of the shield 28. The seam and/or seams should be sealed to prevent leakage when injecting the material used to form the cast 16 between the core 14 and the shield 28.

The cast 16 is formed in the space between the core 14 and the shield 28. The cast 16 will serve as a conduit for directing heat from the core 14 to the shield 28, and will also act as a mechanical support for the core 14. The material selected for the cast 16 must therefore have high thermal conductivity and adequate structural integrity.

In a preferred embodiment, Sty-Cast 2850 KT thermal epoxy with 24 low viscosity (LV) catalyst is utilized for forming the cast 16 around the core 14. Sty-Cast 2850 KT is utilized because of its high thermal conductivity. The 24 LV hardener is utilized to reduce the viscosity of the mixed resin to make it easy to inject.

To form the cast 16, the epoxy is injected into the area between the core 14 and the shield 28. One or more injection ports 30 can be created between the core 14 and the shield 28 for injecting the epoxy. A pressure pot, having the capacity to hold the amount of epoxy needed, can be utilized to inject the epoxy with air pressure into the mold through the epoxy injection port 30. For example, for five gallons of epoxy or less, a five gallon pressure pot, along with eighty PSI of air pressure, can be utilized to inject the epoxy into the mold through injection port 30. An injection hose 32 may be utilized to inject the epoxy into the top mold 12 or the bottom mold 26.

Epoxy should be filled in the cavity between the core 14 and the shield 28 until the epoxy reaches the top of the shield 28. Once the epoxy reaches the top of the shield 28, the epoxy supply should be cut off to discontinue the flow of the epoxy into the injection port 30. The epoxy should be allowed to cure. Typically, twenty-four hours are needed to cure the epoxy. However, under varying circumstances, the time needed to cure the epoxy may also vary. After the epoxy cast 16 is formed, the top mold 12 and bottom mold 26 can be removed from the shield 28. Once the cast 16 is formed, the shield 28 adheres to the cast 16.

Figure 2:
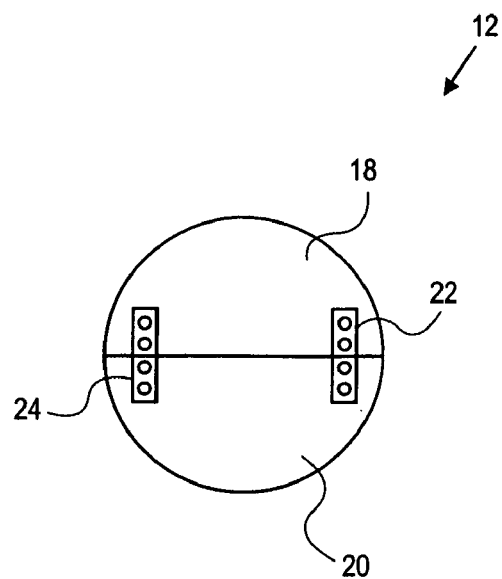
FIG. 2 is a top plan view of a top mold of a super-conducting transformer constructed in accordance with a preferred embodiment of the present invention.

FIG. 2 is a top plan view of the top mold 12. As shown in FIG. 2, mold clamps 22, 24 may be utilized to secure the mold portions 18, 20. The mold portions 18, 20 may also be secured to each other by pins, interlocking mold portions and the like.

Figure 3:
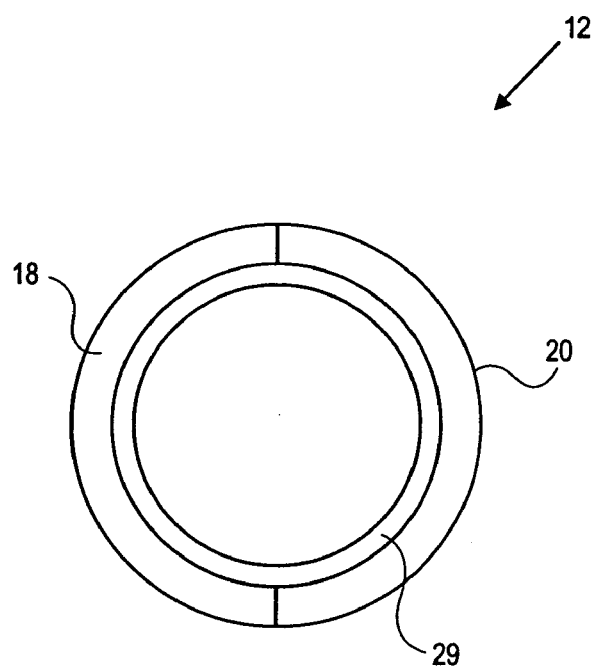
FIG. 3 is a bottom plan view of a top mold of a super-conducting transformer constructed in accordance with a preferred embodiment of the present invention.

FIG. 3 is a bottom plan view of a top mold 12 of a super-conducting transformer 10 constructed in accordance with a preferred embodiment of the present invention. As shown in FIG. 3, the top mold 12 is provided with a recessed portion 29 for accommodating the shield 28.

Figure 4:
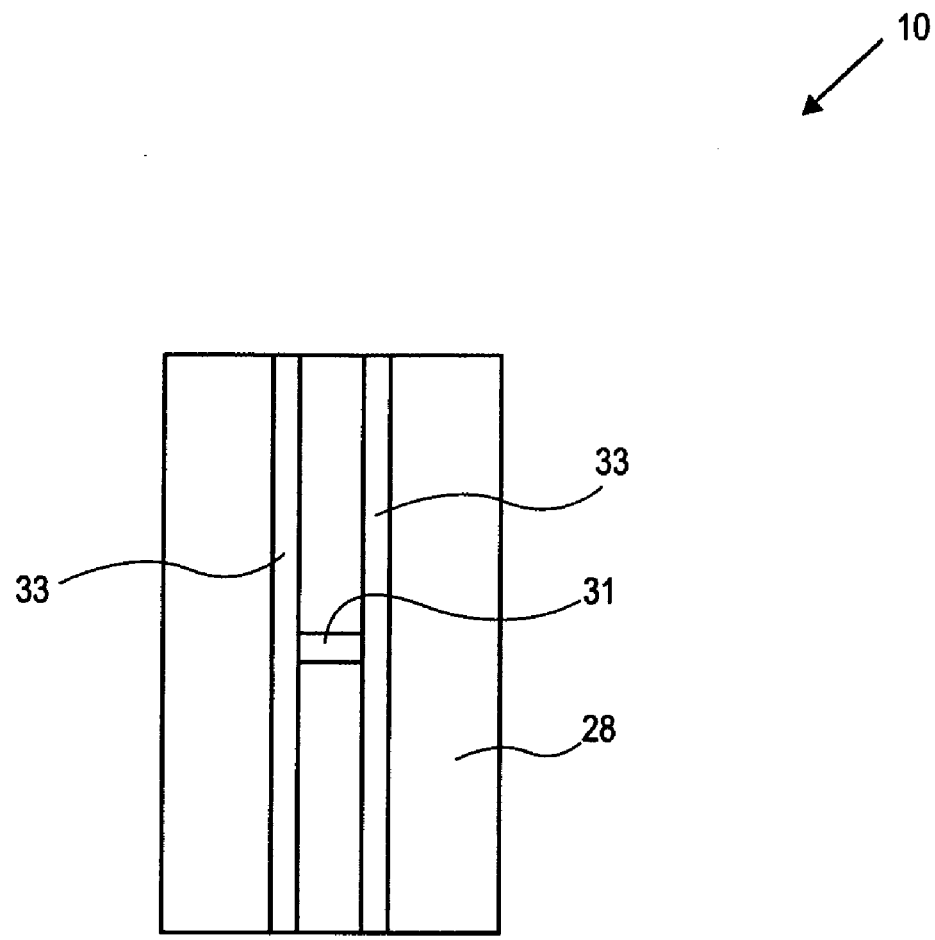
FIG. 4. is a front elevation of a shield positioned around a core of a super-conducting transformer constructed in accordance with a preferred embodiment of the present invention.

FIG. 4 is a front elevation of a shield 28 positioned around a core 14 of a super-conducting transformer 10 constructed in accordance with a preferred embodiment of the present invention. As shown in FIG. 4, the shield 28 may be designed with a dielectric break. In an exemplary embodiment of the present invention, an "H" shaped dielectric break, which is made from a high molecular weight plastic, is utilized that has a horizontal portion 31 and two vertical portions 33. It should be understood that a shield in accordance with the present invention may be assembled with more than one dielectric break.

Figure 5:
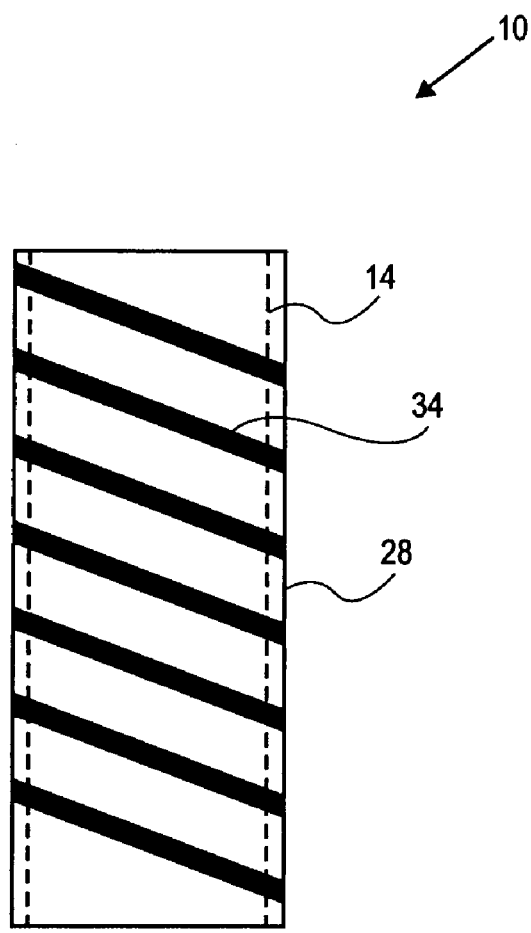
FIG. 5 is a front elevation view of the core of a super-conducting transformer constructed in accordance with a preferred embodiment of the present invention.

As shown in FIG. 5, tubing 34 is wrapped around the outside of the shield 28. In an exemplary embodiment, the tubing 34 should be wrapped from the top or near the top of the shield 28 to the bottom or near the bottom of the shield 28. The tubing 34 may be constructed in various shapes and sizes. In an exemplary embodiment, the tubing 34 is circular in cross-section. In an exemplary embodiment, the diameter of the tubing is *frax*;3;4". *The* tubing may be constructed of various *materials*, such as *iron, copper*, stainless steel and *aluminum. In* an exemplary *embodiment*, the tubing 34 is formed from *copper*.

The spaces between the windings of the tubing 34 around the shield may also vary. In an exemplary embodiment in accordance with the present invention, there is a spacing of three inches between the windings of the tubing 34 formed around the shield 28. Based on the overall diameter of the core 14 and the amount of epoxy required to form the cast 16, the cooling tubing 34 may be placed on the outside perimeter of the shield 28.

To achieve efficiency with respect to the amount of heat transfer, the cooling tubing 34 may also be placed on the inside of the cooling shield 28. By placing the cooling tubing 34 on the inside of the cooling shield 28, the cooling tubing 34 will be in contact with the epoxy and will not have to be bonded to the shield 28.

Further, to prevent conduction, the tubing 34 is placed on the core 14 such that it does not form a closed looped around the core. It is undesirable to generate heat, other than what would normally be generated by the transformer, because this would require the transformers to have additional cooling capacity. Hence, the costs associated with the transformer would increase. If the tubing 34 is formed continuously around the core 14, i.e., such that there is a closed loop, i.e., no break between the windings and/or the ends of the tubing, the tubing 34 will induce a current around the core that will generate heat. By utilizing a dielectric break, between the windings and/or the ends of the tubing 34, such as, for example, air or an insulating material, undesired conduction by the tubing 34 can be avoided.

To secure the tubing 34 to the shield 28, an adhesive, such as a thermal epoxy, may be utilized. By clamping the tubing 34 to the shield 28 and applying a thermal epoxy to the tubing 34, the tubing 34 can be secured to the shield 28. The clamping of the tubing 34 in place should be performed until a bead of the thermal epoxy is formed parallel to the tubing 34 and the shield 28. An epoxy or other adhesive may be utilized to secure the tubing 34 to the shield. In an exemplary embodiment, Duralco 132 Special High Thermal Conductivity Epoxy is utilized as a means for thermally coupling the tubing 34 to the shield 28.

In an exemplary embodiment, in accordance with the present invention, the tubing 34 is wrapped around the shield 28 in a helix pattern, as shown in FIG. 3. The tubing 34 is wrapped around the shield 28 such that there is a dielectric break between the windings and/or ends of the tubing to avoid the induction of a current by the tubing that would increase the amount of heat in the transformer, and thus, increase the required cooling capacity of the transformer.

Figure 6:
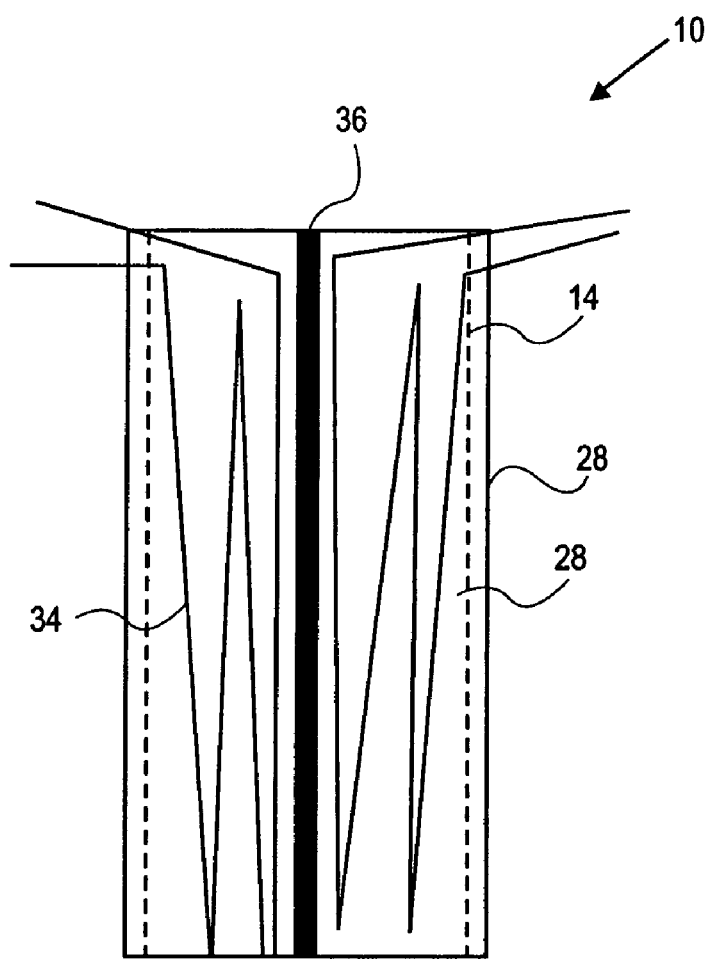
FIG. 6 is a front elevation view of the core of a super-conducting transformer constructed in accordance with a preferred embodiment of the present invention.

The tubing may be co-located with the shield in other manners. In another exemplary embodiment, as shown in FIG. 6, the tubing 36 runs vertically, for example, in a wave pattern, on an inner or outer surface of the shield 28. In an exemplary embodiment of the present invention, a vertical dielectric break 38 is placed between the vertical layers of tubing 34. In a preferred embodiment of the invention, the dielectric break is made from a high molecular weight plastic. It should be understood that the dielectric break may be formed from any type of insulator. By utilizing a vertical pattern it will be easy to avoid the ends of the tubing and/or the windings from connecting and forming a closed conducting loop on the core 14.

The tubing 34, 36 is connected to a fluid supplier, which serves as a means for supplying water or another fluid to the tubing 34, 36. A valve may be connected to the fluid supplier to control the flow of the fluid to and through the tubing 34, 36. Fluids, such as water and oil, may be utilized as fluids for cooling the core 14. Accordingly, the temperature of the cooling shield 28, which cools the core 14 of the transformer, can be controlled by directing water or another cooling fluid through the tubing 34, 36.

Figure 7:
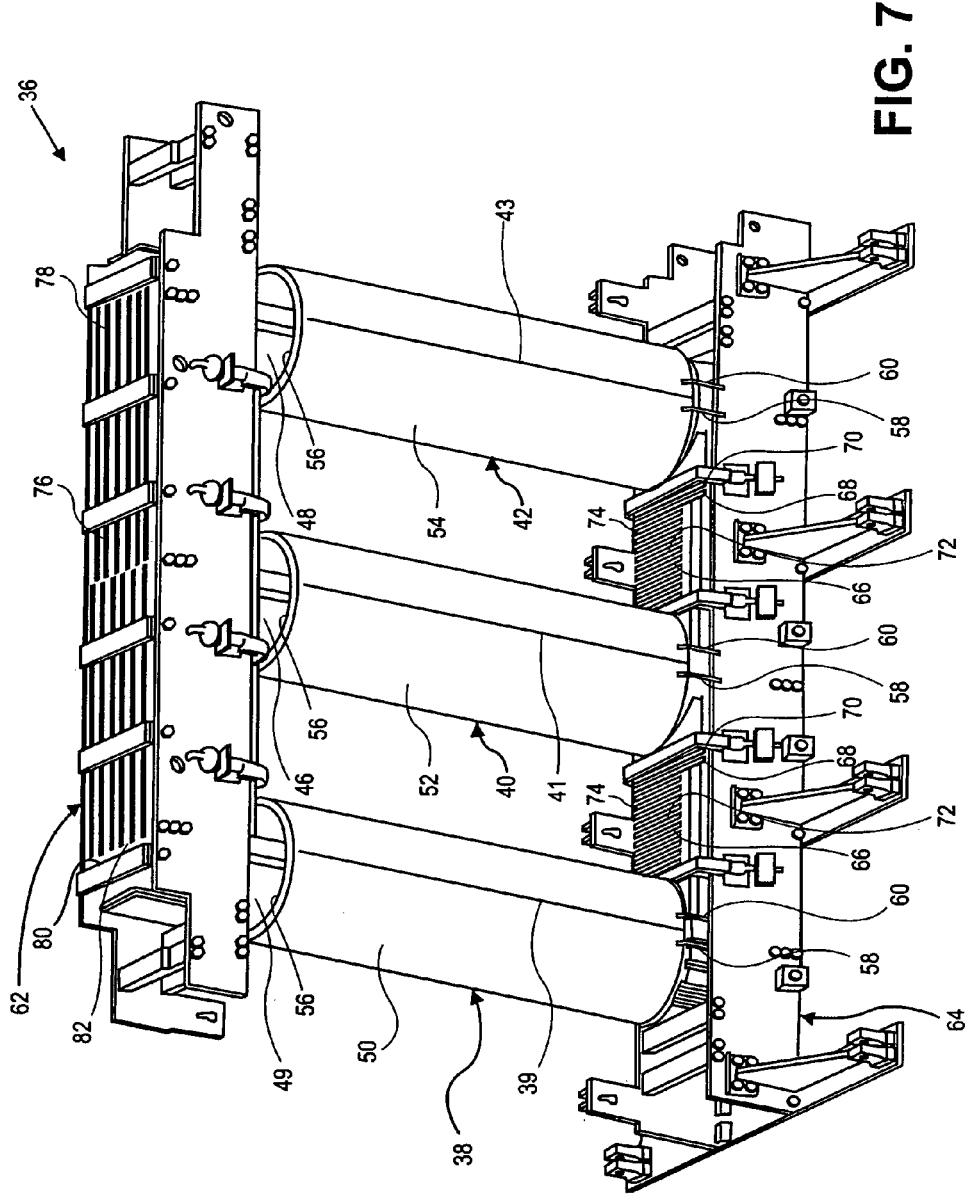
FIG. 7 is a perspective view of a core assembly of a super-conducting transformer constructed in accordance with a preferred embodiment of the present invention.

FIG. 7 is a perspective view of a core assembly of a super-conducting transformer 10 constructed in accordance with a preferred embodiment of the present invention. The core assembly 36 includes core limbs 38, 40, 42, three cores 44, 46, 48 and three shields 50, 52, 54. Dielectric breaks 39, 41, 43, formed from air or a dielectric material, are located between ends of the shield 50, 52, 54. An epoxy cast 46 is formed between each of the cores 44, 46, 48 and each of the shields 50, 52, 54. In an exemplary embodiment of the present invention, cooling tubing is placed between the epoxy cast 56 and the shields 50, 52, 54. Supply and return lines 58, 60 are input to each core limb 38, 40, 42 to provide for the supply of cooling fluid to the tubing and for the return of cooling fluid form the core limbs 38, 40, 42. In an exemplary embodiment the supply and return lines 58, 60 are connected to a cooling apparatus that cools the cooling fluid before it is supplied to the core limbs 38, 40, 42 and after it is returned to the cooling apparatus. Each supply line may be connected and each return line may be connected.

In an exemplary embodiment of a core assembly 36 of a super-conducting transformer 10 in accordance with the present invention, the shield 50, 52, 54 is formed from two halves and supply and return lines are provided for each half of the shield.

A top yoke 62 and a bottom yoke 64 provide support to the core limbs 38, 40, 42. Bottom yoke cooling sections 66 are utilized to cool the area between the core limbs 38, 40, 42. Each bottom yoke cooling section 66 has supply and return lines 68, 70.

In forming the bottom yoke cooling sections, epoxy is placed on the bottom yoke sections between the core limbs 38, 40, 42. A shield 72 is placed on top of the epoxy. In an exemplary embodiment of a core assembly 36 of a super-conducting transformer 10 in accordance with the present invention, cooling tubing 74 is placed on the outside of the shield 72. In another exemplary embodiment of the present invention, the tubing 74 is placed between the epoxy and the shield. The cooling fluid is supplied to the cooling tubing via an irrigation channel of tubing 73 that is connected to the supply and/or return lines 68, 70.

Similarly, cooling tubing 76 is placed on the top yoke 62 by applying epoxy to a surface of the top yoke 62 and placing a shield 78 on top of the epoxy. In an exemplary embodiment, the cooling tubing 76 is placed continuously along a length of the shield 78 that is placed on the top yoke 62. However, the cooling tubing 76 may be placed between the epoxy and the shield 78.

In another exemplary embodiment of the present invention the cooling tubing 76 is placed in sections along a length of the top yoke 72. In addition, the cooling tubing 76 may be placed on a top or bottom surface of the top yoke 62 on just one surface of the top yoke 62. Supply and return lines 80, 82 are provided to supply and return cooling fluid to the cooling tubing 76 and are connected to a cooling apparatus.

It should be understood that a three-phase transformer is shown for purposes of describing the present invention and that the number of core limbs, cooling tubing sections and dielectric breaks may vary.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for controlling the temperature of a core of a transformer, comprising:
   a core for a superconducting transformer;
   a conductive shield, wherein the shield substantially surrounds at least a portion of the core without establishment of electrical contact therewith;
   a cast, wherein the cast is a thermally conductive material that occupies substantially all of the volume between at least a portion of the core and the shield; and
   a thermally conductive, liquid-carrying tube, wherein the tube is so positioned on the shield as to provide heat transfer capability between the shield and the liquid.

2. The apparatus according to claim 1, wherein the shield is made of copper.

3. The apparatus according to claim 1, wherein the cast is made of a thermal epoxy, and wherein a thermal epoxy is a thermally conductive, electrically insulating material exhibiting adhesive properties, capable of transferring heat between other thermally conductive objects, capable of application in a fluid form, and capable of acting as a mechanical support for the core following a hardening process.

4. The apparatus according to claim 1, wherein the tube is made of copper.

5. The apparatus according to claim 1, wherein the tube is formed in a helix surrounding at least a portion of the core.

6. The apparatus according to claim 1, wherein the tube runs in a wave pattern along a vertical axis of and surrounds at least a portion of the core.

7. The apparatus according to claim 1, wherein the cast is formed by using at least one mold to form the cast.

8. The apparatus according to claim 1, wherein the tubing accommodates a fluid for cooling the shield.

9. The apparatus according to claim 1, wherein the conductive shield has the form of a hollow cylinder that substantially surrounds at least a portion of the core at a substantially uniform distance therefrom.

10. The apparatus according to claim 1, wherein the conductive shield further comprises a nonconductive insert, wherein the insert, in conjunction with the shield, establishes a substantially complete fluid barrier around that portion of the core wherearound the shield is positioned.

11. The apparatus according to claim 10, wherein the nonconductive insert further comprises a high molecular weight thermoplastic.

12. The apparatus according to claim 10, wherein the nonconductive insert further comprises a cross-sectional shape resembling a capital letter "H", whereby a first edge and a second edge of the shield are joined to form a substantially continuous cylinder.

13. The apparatus according to claim 10, wherein the nonconductive insert is so positioned as to prevent the shield from forming a closed electrical path around the core.

14. The apparatus according to claim 5, wherein the helical configuration of the tube is embedded in the cast between the core and the shield.

15. The apparatus according to claim 5, wherein the helical configuration of the tube is prevented from forming a closed electrical path surrounding the core by providing at least one dielectric break in the tube.

16. The apparatus according to claim 6, wherein the wave configuration of the tube extends cyclically from a substantially lowest extent of the shield to a substantially highest extent of the shield.

* * * * *